May 14, 1968 R. D. CARPENTER 3,383,196
VANADIUM CARBIDE PROCESS
Filed Feb. 19, 1965 2 Sheets-Sheet 1

INVENTOR
ROBERT D. CARPENTER
BY
ATTORNEY

INVENTOR
ROBERT D. CARPENTER.
BY Frederick J. McCarthy
ATTORNEY

3,383,196
VANADIUM CARBIDE PROCESS

Robert D. Carpenter, Grand Junction, Colo., assignor to Union Carbide Corporation, a corporation of New York
Filed Feb. 19, 1965, Ser. No. 433,967
2 Claims. (Cl. 75—.5)

ABSTRACT OF THE DISCLOSURE

Process for producing vanadium carbide of low oxygen content by heating admixed vanaduim oxide and carbon in a continuously changing atmosphere of non-oxidizing gas.

---

Figure 1:
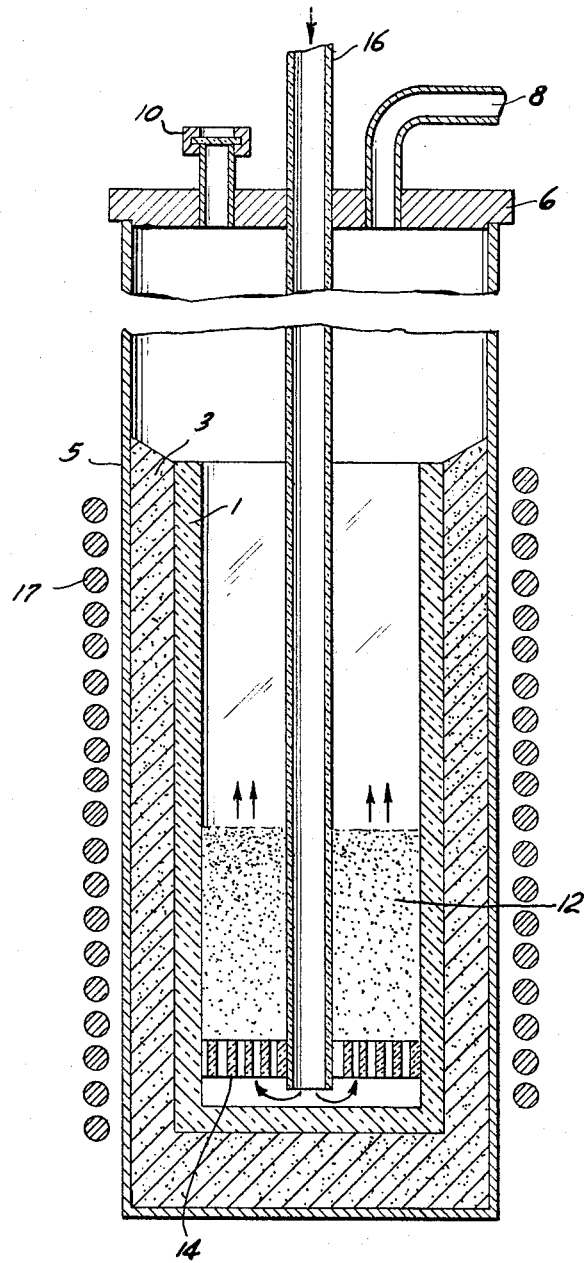

The present invention relates to the production of vanadium carbide. More particularly, the present invention relates to a process for the production of vanadium carbide, having a low oxygen content, by the reduction of vanadium oxide with carbon.

The reduction of vanadium oxide with carbon to provide vanadium carbide containing less than 2 percent oxygen is practically impossible of accomplishment under standard atmospheric conditions in view of the pronounced reversibility of the reaction.

Vacuum processes have therefore been developed, such as disclosed in copending patent application 340,498, which enable the production of vanadium carbide materials having low oxygen contents and which are highly suitable for additions to molten steel.

However, since relatively expensive vacuum equipment and relatively long processing times, up to 30 hours, are required, it would be of industrial benefit to be able to provide a more economical and more rapid method of producing vanadium carbide.

It is therefore an object of the present invention to provide a process for making vanadium carbide having low oxygen contents which can be practiced at ambient pressures corresponding to standard atmospheric pressures.

It is another object of the present invention to provide a process whereby vanadium oxide can be reduced to vanadium carbide in relatively short processing times.

It is a further object of the present invention to provide a process for producing vanadium carbide whereby the composition of the vanadium carbide can be readily controlled.

It is another object to provide strong, dense compacts of vanadium carbide.

Figure 2:
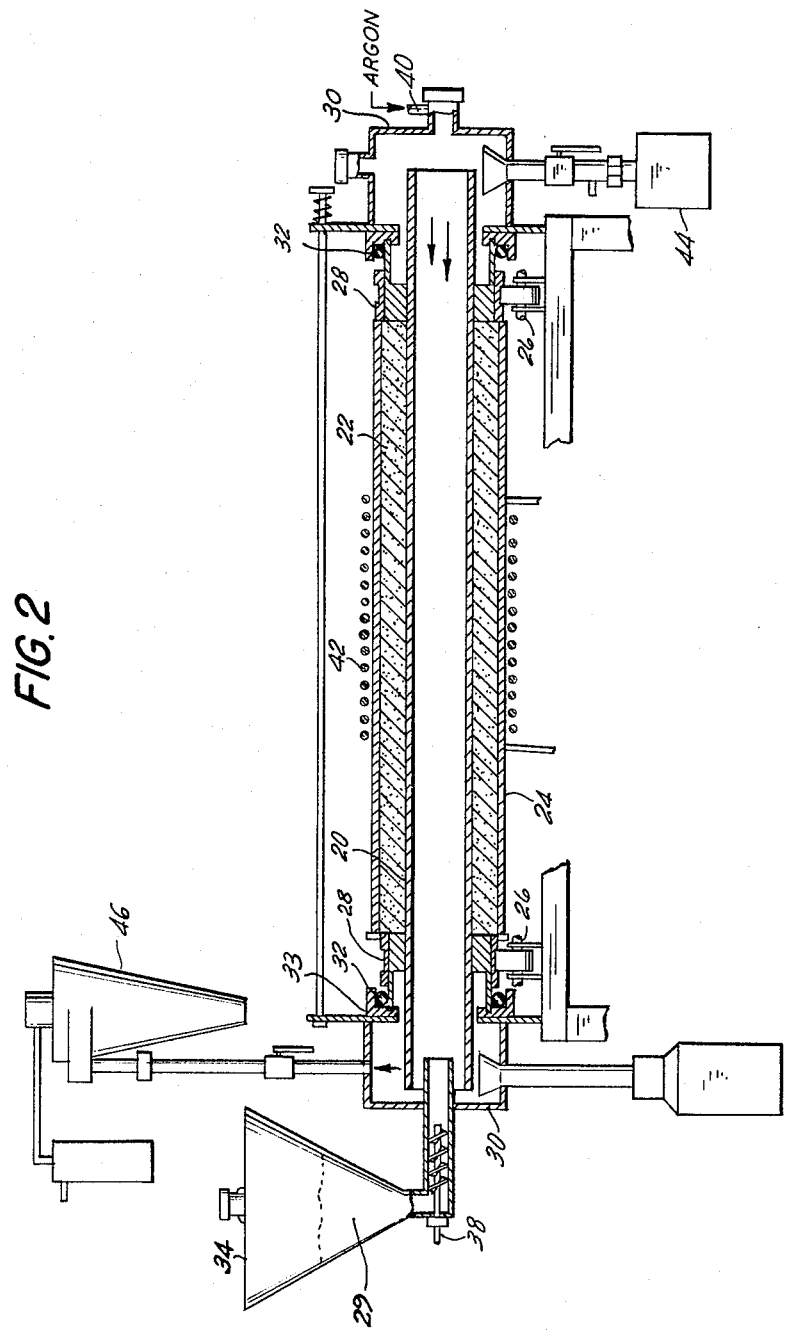

Other objects will be apparent from the following description and claims taken in conjunction with the drawing in which:

FIGURE 1 shows an elevation view of a static bed reactor suitable for the practice of the present invention, and FIGURE 2 shows a rotary kiln arrangement suitable for the practice of the present invetion in a continuous operation.

A process in accordance with the present invention for producing vanadium carbide having a low oxygen content comprises heating and reacting an intimate mixture of finely divided vanadium oxide with finely divided carbon in a moving and continuously changing atmosphere of non-oxidizing gas and cooling the resulting solid reaction product in a non-oxidizing atmosphere to avoid substantial re-oxidation of the carbide product.

In the present invention, it is an essential feature that the vanadium oxide-carbon charge be reacted in a moving and continuously changing non-oxidizing gas atmosphere, e.g., in contact with a stream of argon or other noble gas, since it has been discovered that in this manner the reaction will proceed rapidly at temperatures as low as 1400° C. and under pressures corresponding to atmospheric pressure, to provide a vanadium carbide product containing less than 2 percent oxygen.

As a consequence, standard and relatively inexpensive process equipment can be employed and process operating times are short, e.g., 0.5 to 3 hours.

The circulating non-oxidizing gas atmosphere functions to remove gaseous reaction products from contact with the solid reaction materials as they are formed, thus enabling the carbide reaction to go to completion.

On the other hand, a static inert gas atmosphere will not provide the desired results since the development of gaseous reaction products in the vicinity of the charge will cause the carbide-forming reaction to cease before a satisfactory product, i.e. one containing less than 2.0 percent oxygen, is formed.

Thus, it can be seen, that in the present invention the circulating non-oxidizing gas atmosphere serves a dual function; it provides a non-oxidizing reaction environment so that reoxidation of the carbide reaction product is avoided; and it removes gaseous reaction products from the reaction zone so that the carbide-forming reaction can go essentially to completion.

After the formation of the desired carbide at reaction temperatures the usual and convenient practice is to cool the material in a non-oxidizing gas atmosphere to room temperature so as to avoid re-oxidation. It is not absolutely necessary, however, to cool the carbide product as low as room temperature before exposure to the atmosphere since substantial re-oxidation will not ordinarily take place below 400° C.

In practice of the present invention, vanadium oxide, preferably sized 65 mesh and finer, is mixed with finely divided carbon. The sizing of the carbon is preferably 200 mesh and finer. The blending of the vanadium oxide and carbon can be suitably accomplished using a vibrating mill or a muller type of mixer.

When the mixture has been prepared, it can be processed, either in powder form or as compacts, using static bed type reactors, or in moving bed equipment such as rotary kilns.

In either event, the reaction chamber of the equipment is adapted to be sealed from the atmosphere and means are provided so that non-oxidizing gas can be passed through the reaction chamber to contact and pass through the reaction mixture of vanadium oxide and carbon.

In a static bed device, the reaction mixture can be supported on a perforated plate and inert gas introduced in a manner such as to flow in a stream upward through the charge.

With rotary kilns, inert gas can be introduced at the discharge end of the kiln and caused to flow therethrough and exit in the vicinity of the charge inlet. In this instance the continuous movement of the charge supplements the circulating effect caused by the flow of argon.

It has been found that with the present invention, to produce vanadium carbide containing less than 2.0 percent oxygen, the reaction temperature can be as low as 1400° C. with reaction times ranging from 0.5 to 3 hours. While higher temperatures can be used, temperatures above 2000° C. are not practical due to equipment limitations and the preferred operating temperature is from about 1400–1800° C. The required flow of non-oxidizing gas through the reaction mixture will vary with the particular processing equipment employed and the size and arrangement of the charge. However, the example presented hereinbelow will indicate operating conditions which have been found suitable. In general, for the production of a given carbide composition, increasing the rate of argon flow shortens the reaction time and leads to the production of a product having a lower oxygen content.

In preparing the reaction mixtures in accordance with the present invention, to obtain a suitably low oxygen product, between 90 and 110 percent of the stoichiometric amount of the carbon theoretically required to produce the desired carbide, or mixtures of carbides, can be used based on the following exemplary equations:

$$V_2O_3 + 5C \rightarrow 2VC + 3CO$$
$$V_2O_3 + 4C \rightarrow V_2C + 3CO$$
$$V_2O_5 + 6C \rightarrow 2VC + CO_2 + 3CO$$
$$V_2O_5 + 5C \rightarrow V_2C + CO_2 + 3CO$$

In a further embodiment of the present invention, finely divided iron powder suitably sized to minus 35 mesh is blended with vanadium oxide and carbon and compacts are prepared and treated as aforedescribed. The presence of iron in the product leads to increased strength and density in the final product. The preferred proportion of iron powder is that which provides between about 1.5 and 10 percent iron in the final product.

With reference to the drawing, FIGURE 1 shows a graphite crucible 1 packed in and supported by powdered carbon 3 and enclosed in a quartz tube 5 having a tight-fitting cover 6 which seals the crucible from the atmosphere. A gas exit 8 and sight glass 10 are also provided.

In the practice of the present invention, a suitable charge of vanadium oxide and carbon, indicated at 12 either in the form of pellets or a powdered mixture, is placed in the crucible and supported on a perforated graphite plate 14. A non-oxidizing gas, such as argon, is introduced through gas inlet tube 16 to purge the system of oxygen, after which the charge is heated to a suitable temperature e.g., 1400–1800° C. by means of high frequency coil 17. During heating, the argon gas is continuously introduced through tube 16 and passes upward through the charge and exits at 8 together with gaseous reaction products. After the carbide forming reaction has been completed, which is indicated by the absence of reaction product in the gas exiting at 8, the solid reaction material in the crucible is cooled, under argon, to below 400° C. The product can then be recovered and used directly as an addition in the manufacture of steel.

With reference to FIGURE 2, continuous operation of the present invention is provided by a rotary kiln having a graphite tube 20 packed in powdered carbon insulation 22 and arranged in a refractory shell 24. Mechanically driven rollers 26 engage steel end sections 28 and cause rotation of the kiln and the vanadium oxide-carbon charge 29 which is sealed from the atmosphere by end housings 30, seal rings 32, and gas-tight hopper 34. In operation, vanadium oxide-carbon charge indicated at 29, is introduced into the kiln via feed mechanism 38 after the kiln has been purged of oxygen by argon introduced at 40. The flow of argon is continually passed countercurrent through the kiln and the charge is heated to between 1400–1800° C. by means of high frequency coil 42 whereby the charge reacts to form vanadium carbide which exits the kiln and is collected and cooled under argon at 44. Gaseous reaction products are swept from the kiln by the flow of argon and exit by way of gas scrubber arrangement 46.

The aforedescribed kiln process is particularly advantageous in that continuous production of vanadium carbide can be obtained. Further, since the use of pelletized charge materials in the process of the present invention has been found to result in the formation of hard, dense and non-friable vanadium carbide compacts, kiln operation is especially suitable.

The following examples will further illustrate the present invention.

EXAMPLE I

Vanadium oxide, $V_2O_3$, sized to minus 65 mesh in the amount of 400 grams, and Thermax Carbon,[1] sized minus 200 mesh in the amount of 176 grams, were blended by mixing dry in a double cone blender. The amount of carbon was 10 percent in excess of the stoichiometric requirement for the production of VC.

Using apparatus as shown in FIGURE 1, the mixture thus obtained was arranged in a layer approximately 4 inches in depth, in the graphite crucible which had a 3¼ inches inside diameter and was 9½ inches deep. The graphite crucible was enclosed in a quartz tube as indicated in FIGURE 1 and sealed from the atmosphere.

After charging the mixture to the crucible, the system was purged with argon and the charge was heated by induction to 1500° C. and held at this temperature for 1 hour and 45 minutes. During heating of the charge, argon was introduced at the bottom of the crucible to pass through the charge and was withdrawn at the gas exit at the top of the crucible. The rate of argon flow was 1.5 to 2.5 liters per minute.

At the end of the heating period the solid material in the crucible was cooled to room temperature under argon. The solid material was in the amount of 339 grams and was in the form of a powder analyzing 77.31% V, 21.66% C, 4.487% $O_2$, 0.028% $N_2$. This analysis corresponds to the empirical formula $V_{0.84}C$.

EXAMPLE II

Vanadium oxide, $V_2O_3$, sized minus 65 mesh in the amount of 600 grams, and Thermax Carbon, sized minus 200 mesh in the amount of 240 grams, were blended and mixed with 26% by weight water. The carbon was the stoichiometric amount required to produce VC. The resulting wet mix was extruded to form compacts ¼ inch in diameter by ½ inch in length and the wet compacts were dried in air for 16 hours at 150° C.

Using the same apparatus as in Example I, the dried compacts, in the amount of 660 grams, were arranged in a layer approximately 6 inches in depth in the graphite crucible.

After charging the compacts to the crucible, the system was purged with argon and the charge was heated to 1500° C. and held at this temperature for 2 hours and 45 minutes. During heating of the charge, argon was introduced at the bottom of the crucible to pass through the charge and was withdrawn at the gas exit at the top of the crucible. The rate of argon flow was one liter per minute. At the end of the heating period, the compacts were cooled to room temperature under argon. The compacts, in the amount of 377 grams, were light gray in color and analyzed 82.08% V, 17.78% C, 0.228% $O_2$, 0.071% $N_2$. This analysis corresponds to the empirical formula $V_{1.09}C$.

EXAMPLE III

Vanadium oxide, $V_2O_3$, sized minus 65 mesh in the amount of 35 pounds, Thermax Carbon, sized minus 200 mesh in the amount of 12.9 pounds, iron powder, sized minus 35 mesh in the amount of 0.6 pound, and 0.11 pound of dextrine were milled dry for 30 minutes in a vibrating ball mill and then blended with 22 percent by weight water. The resulting wet mix was extruded into compacts ¼ inch in diameter by ½ inch in length and the wet compacts were dried at 150° F. for 24 hours. The amount of carbon was 92 percent of the stoichiometric requirement for VC.

Using the same apparatus as in Example I, a portion of the dried compacts, in the amount of 400 grams, was arranged in a layer about 4 inches in depth in the graphite crucible.

After charging the compacts to the crucible, the system was purged with argon and the charge heated to 1400° C. and held at this temperature for 1 hour. During the heating, argon was introduced at the bottom of the crucible to pass upward through the charge and was withdrawn at the gas exit at the top of the crucible. The rate of argon flow was about 3.7 liters per minute. At the end of the heating period the compacts were cooled ---
[1] Trademark, R. T. Vanderbilt Co.

to room temperature under argon. The compacts in the amount of 222 grams were light gray in color, hard, dense and non-friable. Analysis of the compacts showed 81.86% V, 14.51% C, 2.07% Fe, 0.622% $O_2$, 0.0048% $N_2$. This analysis corresponds to the empirical formula $V_{1.33}C$.

EXAMPLE IV

Vanadium oxide, $V_2O_3$, sized to minus 65 mesh in the amount of 35 pounds, Thermax Carbon, sized to minus 200 mesh in the amount of 12.3 pounds, iron powder, sized to minus 35 mesh in the amount of 0.6 pound, and dextrine in the amount of 0.11 pound were milled together in a vibrating ball mill for 30 minutes and then blended with 22 percent by weight water. The resulting wet mix was extruded into compacts ¼ inch in diameter by ½ inch in length and the wet compacts were dried at 150° F. for 24 hours. The amount of carbon was 110 percent of the stoichiometric requirement for $V_2C$.

Using the same apparatus as in Example I, a portion of the dried compacts, in the amount of 400 grams, was arranged in a layer about 4 inches deep in the graphite crucible.

After charging the compacts to the crucible the system was purged with argon and the charge was heated to 1700° C. and held at this temperature for ½ hour. During the heating, argon was introduced at the bottom of the crucible to pass upward through the charge and was withdrawn at the gas exit at the top of the crucible. The rate of argon flow was about 3.7 liters per minute.

At the end of the heating period the compacts were cooled to room temperature under argon. The compacts in the amount of 184 grams were light gray in color, hard, dense, and non-friable. Analysis of the compacts showed 85.68% V, 10.22% C, 2.57% Fe, 0.69% $O_2$, and 0.166% $N_2$. This analysis corresponded to an empirical formula of $V_{1.97}C$.

EXAMPLE V

Vanadium oxide, $V_2O_5$, sized to minus 150 mesh in the amount of 250 grams, Thermax Carbon, sized to minus 200 mesh in the amount of 90.75 grams, iron powder, sized to minus 35 mesh in the amount of 3.2 grams, and dextrine in the amount of 3.2 grams were blended together with about 25 percent by weight water and formed into balls approximately ½ inch in diameter. The wet balls were dried at 100° C. for 16 hours. The amount of carbon was 110 percent of the stoichiometric requirement for $V_2C$.

Using the same apparatus as in Example I, a portion of the dried balls, in the amount of 328 grams, was arranged in a layer about 4 inches in depth in the graphite crucible.

After charging the balls to the crucible, the system was purged with argon and the charge was heated to 1700° C. and held at this temperature for 65 minutes. During the heating, argon was introduced at the bottom of the crucible to pass upward through the charge and was withdrawn at the gas exit at the top of the crucible. The rate of argon flow was about 1.08 liters per minute. At the end of the heating period, the balls were cooled to room temperature under argon. The balls in the amount of 156.5 grams were a light gray in color, hard, dense, and non-friable. Analysis of the balls showed 84.17% V, 12.93% C, 1.94% Fe, 0.156% O, and 0.008% N. This analysis corresponds to an emipircal formula of $V_{1.54}C$.

EXAMPLE VI

Vanadium oxide, $V_2O_3$, sized minus 65 mesh in the amount of 105 pounds, Thermax Carbon, sized minus 200 mesh in the amount of 38.6 pounds, iron powder, sized minus 35 mesh in the amount of 1.76 pounds, and 0.165 pound of starch were milled for 30 minutes in a vibrating ball mill and then blended with 22 percent by weight of water. The resulting wet mix was extruded into compacts ½ inch in diameter by ½ inch in length and the wet compacts were dried at 150° F. for 24 hours. The amount of carbon was 92 percent of stoichiometric requirement for VC.

A rotating kiln, as shown in FIGURE 2, having an inner diameter of 4 inches and a length of 9 feet, was purged with argon and heated by means of an induction coil. Dried compacts were then fed continuously into the kiln at a rate of 20 pounds per hour. During passage of the compacts through the kiln, argon was introduced at the outlet end of the kiln, passed countercurrent to the charge, and withdrawn at the inlet end of the kiln at the rate of 3.9 liters per minute. The average residence time of compacts in the kiln was 1 hour and 40 minutes and for about 28 minutes the compacts were at a reaction temperature of 1650° C.

The compacts upon exiting the kiln were cooled under argon to room temperature. The product, in the amount of 78.25 pounds was in the form of black, hard, dense, and non-friable compacts, corresponding in size and shape to the starting material. Analysis of the compacts showed 82.38% V, 13.80% C, 1.7% Fe, 0.89% $O_2$, 0.022% $N_2$. This analysis corresponds to the empirical formula $V_{1.41}C$.

The following example shows the effect of not providing a moving and continuously changing non-oxidizing reaction environment.

EXAMPLE VII

Vanadium oxide, $V_2O_3$, sized to minus 65 mesh in the amount of 35 pounds, Thermax Carbon, sized to minus 200 mesh in the amount of 12.9 pounds, iron powder, sized to minus 35 mesh in the amount of 0.6 pound, and 0.11 pound of dextrine were formed into compacts ¼ inch in diameter by ½ inch in length by the aforementioned procedure of the foregoing example. The compacts were dried at 150° F. for 24 hours. The amount of carbon was 92 percent of the stoichiometric requirement for VC.

Using the same apparatus as in Example I, a portion of the dried compacts, in the amount of 400 grams, was arranged in a layer about 4 inches in depth in the graphite crucible.

After charging the compacts to the crucible, the system was purged with argon to provide an argon atmosphere in the crucible and the charge was heated to 1700° C. and held at this temperature for one hour. During the heating, the gas inlet tube was sealed and no argon was introduced into the system. At the end of the heating period, the compacts were cooled to room temperature in the existing atmosphere. The compacts, in the amount of 210 grams, were black in color and analyzed 80.78% V, 12.68% C, 1.98% Fe, 2.81% $O_2$, and 0.235% $N_2$.

The inert gases suitable in the practice of the present invention include all the noble gases helium, neon, argon, krypton, and xenon. Nitrogen can be used in the cooling step to provide a nitrided product if desired.

Mesh size referred to in the foregoing description are Tyler screen scale series.

I claim:
1. A process for producing vanadium carbide in the form of compacted pellets which comprises:
 (i) providing an intimate mixture of finely divided vanadium oxide with finely divided carbon, the amount of carbon in the mixture being between about 90 percent and 110 percent of the stoichiometric amount theoretically required to produce the desired carbide,
 (ii) forming the mixture into pellets,
 (iii) introducing the pellets in a continuous manner into contact with a moving and continuously changing atmosphere of inert gas at a temperature in the range of about 1400° C. to 1800° C. to cause reaction of the vanadium oxide and carbon and the formation of pellets of vanadium carbide containing less than 2 percent oxygen, the pressure of said continuously changing atmosphere of inert gas being substantially atmospheric pressure,

(iv) continuously withdrawing vanadium carbide pellets from contact with the continuously changing atmosphere of non-oxidizing gas, and
(v) cooling the withdrawn vanadium carbide pellets to below about 400° C. in a non-oxidizing atmosphere.

2. A process in accordance with claim 1 wherein the cooling of the vanadium carbide pellets is accomplished using nitrogen gas whereby a nitrogen bearing product is obtained.

References Cited

UNITED STATES PATENTS 3,013,875   12/1961   Triffleman _____ 75—.5

HYLAND BIZOT, *Primary Examiner.*

DAVID L. RECK, *Examiner.*

W. W. STALLARD, *Assistant Examiner.*